United States Patent [19]
Vogel

[11] 3,901,079
[45] Aug. 26, 1975

[54] TWO-MODE CAPACITIVE LIQUID LEVEL SENSING SYSTEM

[75] Inventor: Ronald F. Vogel, Bettendorf, Iowa

[73] Assignee: Agridustrial Electronics, Inc., Bettendorf, Iowa

[22] Filed: June 18, 1974

[21] Appl. No.: 480,527

[52] U.S. Cl. .............................. 73/304 C; 73/304 C
[51] Int. Cl.$^2$ ......................................... G01F 23/26
[58] Field of Search ....................... 73/304 C, 304 R

[56] References Cited
UNITED STATES PATENTS

| | | | |
|---|---|---|---|
| 2,724,273 | 11/1955 | Sontheimer ........................ | 73/304 C |
| 3,037,165 | 5/1962 | Kerr .................................. | 73/304 C |
| 3,170,479 | 2/1965 | Mueller ............................. | 73/304 R |
| 3,389,602 | 6/1968 | Clemens ............................ | 73/304 C |
| 3,543,046 | 11/1970 | Tiffany .............................. | 73/304 C |
| 3,665,209 | 5/1972 | Webb ................................. | 73/304 C |
| 3,771,548 | 11/1973 | Rauchwerger ..................... | 73/304 C |

*Primary Examiner*—Richard E. Aegerter
*Assistant Examiner*—A. Jason Mirabito
*Attorney, Agent, or Firm*—Glenn H. Antrim

[57] ABSTRACT

A reference capacitive probe for sensing permittivity is substantially longer than the short reference probes positioned near the bottom of a tank in prior systems. Like former reference probes its lower end is spaced only far enough above the bottom of fuel tanks to avoid water, but its upper end may be at a substantial height above the bottom, such as one-fourth to one-third of the height of a tank. A main probe, used for measurement, has its lower end at a level far enough above the lower end of the reference probe to provide a substantial predetermined difference in increases of capacitances in the probes due to presence of liquid while the level of the liquid is intermediate the limits of overlapping capacitive portions of the probes. Voltage that is a function of this predetermined difference of capacitances is used as a reference in a permittivity-compensating circuit as long as the level of liquid is below the upper end of the capacitive portion of the reference probe, and a mode-switching means conditions the compensating circuits to use as a reference the voltage that is a function of only the capacitance of the reference probe while the level of liquid is high enough to fill the capacitive portion of the reference probe. Through two-mode operation along with the use of a longer reference probe to sense permittivity over greater differences in depth, two portions of output curves are selected to provide accurate, linear readings over a wide range of level of liquid.

12 Claims, 9 Drawing Figures

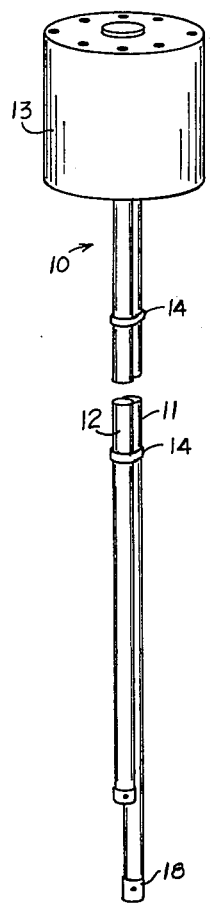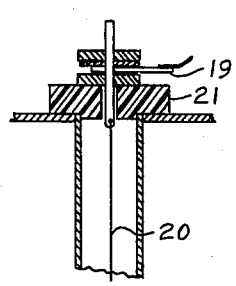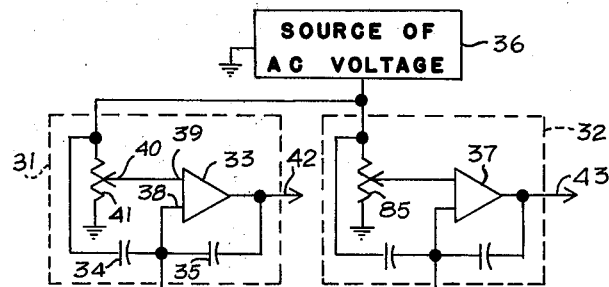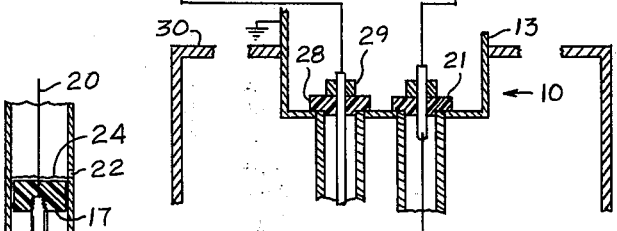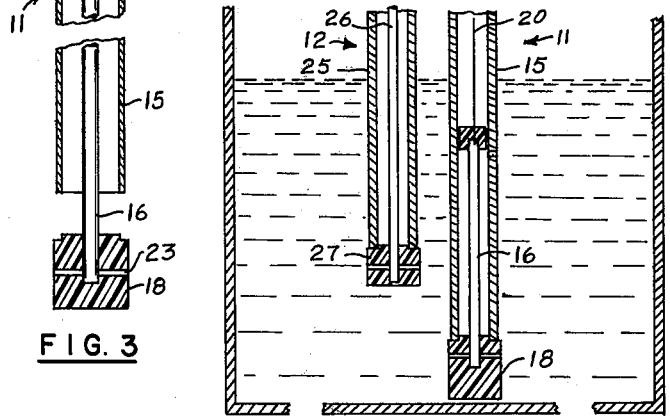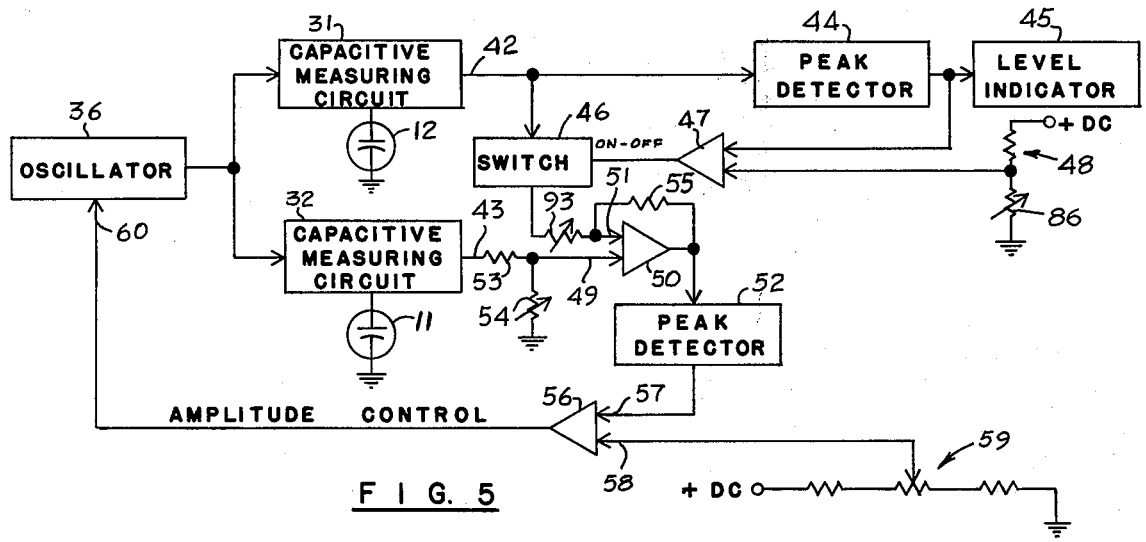

TWO-MODE CAPACITIVE LIQUID LEVEL SENSING SYSTEM

BACKGROUND OF THE INVENTION

This invention relates to systems for measuring level of liquids, and more particularly to systems having pluralities of capacitive probes and two modes of operation of circuits that compensate for changes of permittivity or dielectric constant.

The level of liquids in storage tanks have commonly been measured electrically by systems having probes inserted at predetermined heights in the tanks. The probes have electrical values that are a function of the height of liquid about them. Inductive and resistive characteristics for measuring liquids of different characteristic qualities have been used, but capacitive probes have been used extensively for measuring the levels of gasoline and other fuels because dielectric rather than resistive or magnetic qualities are most suitable for measurement.

Commonly, each capacitive probe assembly includes a short reference portion below a long measuring or main portion. The long portion extends from a point a short distance above the bottom to the top of the tank, and its change in capacitance resulting from its being filled to the height of the liquid in the tank is measured to determine, with reference to calibration, the amount of liquid in the tank. Since the density affecting the dielectric constant of liquids change with conditions in the tanks, particularly with temperature, the sensitivity of the measuring circuits connected to the long probes must be changed as required to compensate for different conditions of the liquids. Since prior reference probes are very short compared with the measuring probes and are positioned near the bottoms of the respective tanks, the reference probes are completely immersed in liquid during measurement. For the required compensation, changes in capacitances of the reference probes may control the amplitude of the outputs of the respective oscillators that provides signal to the circuits connected to the respective measuring probes.

In the system described in U.S. patent application Ser. No. 385,831 entitled "Multielectrode Capacitive Liquid Level Sensing System" filed by Ronald F. Vogel on Aug. 6, 1973 and assigned to the assignee of the present application, now, U.S. Pat. No. 3,862,571 issued Jan. 28, 1975 rather than controlling the oscillator connected to the measuring circuit, the system has two branches operating as a bridge circuit to cancel changes in capacitances other than changes that are a function of the height of liquid.

SUMMARY OF THE INVENTION

An object of this invention is to measure accurately levels of liquids throughout wide ranges.

A feature of the invention is the ease of calibration because the electrical output of the system changes linearly with the changes in level.

Another feature is that the reference portion of the probe assembly of the device senses permittivity of the liquid in which it is inserted throughout different depths according to the level of liquid. The reference portion has substantial length, for example one-fourth the height of a tank, and while liquid is above the reference portion, the average permittivity throughout the extent of the reference portion is used to obtain compensation.

In order to obtain these features, the compensating circuit of this system switches between two modes of operation as the level of liquid passes through a predetermined level. This operation provides the desired linear operation. In a preferred embodiment, two pipes are mounted parallel to provide the outer conductors of the two capacitive probes of the assembly. One of the pipes has an inner conductor substantially throughout its length, and it is connected in a main circuit to sense the level of liquid. The other pipe has a shorter inner conductor coaxially mounted in only its lower portion, and a liquid seal about the upper end of this shorter inner conductor prevents liquid from rising above it in the outer conductor. A strong, small conductor, such as piano wire, is connected to the upper end of the shorter inner conductor and extends coaxially upwardly within the respective outer conductor to its upper end to provide a connection from the inner conductor to capacitive measuring circuits. The lower end of the shorter or reference inner conductor extends substantially below the level of the lower end of the longer inner conductor of the other probe. The portions of the capacitive portions between the level of the lower end of the longer probe and the upper end of the capacitive portion of the shorter reference probe is called the overlapping portions. A substantial difference between increases in capacitance due to presence of liquid can be measured when the level of the liquid is between the limits of the overlapping portions of the inner conductors.

The longer capacitive probe is connected in the main or measuring channel to provide readings for levels of liquids. It is connected to a capacitive measuring circuit that provides output voltage as a function of its increased capacitance due to presence of liquid. The output of the capacitive measuring circuit is connected through a peak detector to an output indicator. Although the block diagram of this portion of the measuring system is quite conventional, it includes an improved capacitive measuring circuit that contributes to accuracy and easy adjustment for cancelling the empty capacitances of the capacitive portions.

Conventionally, a compensating circuit is connected to the main channel to change its output voltage as required to compensate for changes in the permittivity of the liquids in which the measuring probe is inserted. The new probe assembly with its overlapping portion and a new, two-mode compensating circuit cooperate to provide the accurate, linear characteristics of the present sensing system. The shorter or reference probe is connected to a capacitive measuring circuit that is similar to that connected to the longer portion of the probe, and the outputs of both capacitive measuring circuits are connected respectively to different inputs of the compensating circuit. At least one of the inputs of the compensating circuit includes a switching system operable between two states in response to change of voltage derived from at least one of the capacitive measuring circuits as the surface of liquid being measured passes through a level even with the upper end of the capacitive portion of the reference probe.

The compensating circuit of one embodiment also includes a difference amplifier having its inputs connected to respective outputs of the capacitive measuring circuits. While the level of the liquid into which the probe assembly is inserted is intermediate the overlapping limits of the two capacitive portions, the voltage that is the function of the differences of the voltages derived from the two capacitive measuring circuits is used in the compensating circuit to provide the required compensation to the main channel. As the surface of the liquid becomes higher than the upper end of the capacitive portion of the reference probe, the switching circuit is effective to disconnect the output of that capacitive measuring circuit connected to the main probe from the compensating circuits, and the output of only the capacitive measuring circuit connected to the reference probe is used for compensation.

Satisfactory compensation can be obtained by connecting the output of the compensating circuits to control the amplitude of an oscillator of a system. The oscillator supplies operating voltage to both of the capacitive measuring circuits, and its amplitude is controlled to provide a constant reference voltage in the compensating circuit. While the level of liquid is intermediate the limits of the overlapping portions of the probes, the difference of the voltages developed at the outputs of the capacitive measuring circuits is maintained at a predetermined value. While the level of liquid is above the upper end of the capacitive portion of the reference probe, the compensating circuit is effective to maintain a constant voltage at the output of the capacitive measuring circuit connected to the reference probe. The operating voltage applied from the oscillator to the capacitive measuring circuits is thus controlled to provide output reading independent of permittivity of the liquid.

In another embodiment, the output of the differential amplifier and the output from only the channel connected to the reference portion of the probe are applied selectively, according to level of liquid, to one input of a divider circuit. The other input of the divider circuit is connected continuously to the output of only that capacitive measuring circuit connected to the main probe. The output or quotient of the divider is the voltage for indicating level, and this voltage being a ratio of two voltages that are affected in the same proportion by permittivity, is independent of permittivity.

BRIEF DESCRIPTION OF THE DRAWING

FIG. 1 is an oblique, upright view of the probe assembly having two capacitive probes according to this invention;

FIG. 2 is a vertical cross section of portions of the longer probe of FIG. 1 to show particularly a relatively short lower capacitive portion;

FIG. 3 shows the lower portion of the probe of FIG. 2 as it appears during assembly;

FIG. 4 shows in cross section portions of the probes of FIG. 1, the probes shown separated for clarity, installed in a container for liquid, and each connected to a respective capacitive measuring circuit;

FIG. 5 is a block diagram of a preferred circuit of the level measuring system of this invention;

DESCRIPTION OF THE PREFERRED EMBODIMENTS

Figure 6:
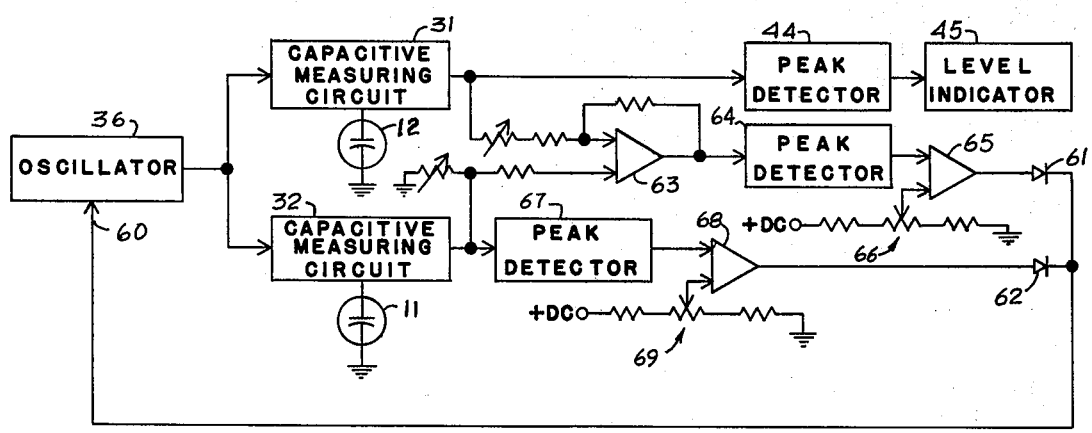
FIGS. 6, 7, and 8 show block diagrams of modifications of the circuit off the level measuring system.

A probe assembly 10 of FIG. 1 comprises adjacent, parallel probes 11 and 12 secured to an upper cylindrical housing 13. The probes 11 and 12 are bound tightly together by spaced straps 14. The probe 11 is a reference probe, and it is somewhat longer than probe 12, the lower end of the reference probe being quite close to the bottom of the tank. The probe 12 is the main probe for providing output readings of level.

Construction of the reference probe 11 is shown in more detail in the cross section of FIG. 2. The capacitive portion of the probe comprises the lower portion of an outer conductor or pipe 15 and a conductor or pipe 16 mounted coaxially in the lower portion of the pipe 15. Typically, the outer conductor of either of the probes 11 or 12 may be 1-inch pipe, and the inner conductor of each probe may be ¼-inch pipe. Although the outer conductor 15 of the reference probe 11 is longer than the outer conductor of the main probe 12, the capacitive portion of the reference probe is shorter than that of the main probe because the inner conductor 16 of the probe 11 extends only within the lower portion, for example, in a portion equal to about one-fourth to one-third of the length of the outer conductor 15 of the probe 11. The inner conductor 16 is mounted coaxially within the lower portion of the outer conductor 15 by insulating washers 17 and 18 in the outer conductor 15 at the upper and lower ends respectively of the inner conductor 16. A connecting lead from the upper end of the inner conductor 16 to electronic circuits contained in the housing 13 ought to have very low capacitance compared to the capacitance provided by the inner conductor 16 so that changes in capacitance resulting from liquid within the lower portion of the outer conductor 15 will provide a comparatively large electrical change in the measuring circuit.

The connecting arrangement shown in FIG. 2 has much less distributed capacitance than the characteristic capacitance of usual coaxial cable. A small, strong conductor 20 such as piano wire is connected from the upper end of the inner conductor 16 to a terminal 19 at the upper end of the probe. The wire 20 is coaxially positioned by an insulator 17 at the upper end of the inner conductor 16 and an insulator 21 that has a shoulder to fit within the upper end of the outer conductor 15. A vent hole 22 through the wall of the outer conductor 15 is located just below the insulator 17.

Assembly of the reference probe 11 is shown in FIG. 3. The piano wire 20 is threaded through a small hole in the upper insulator 17 of the inner conductor 16. A central hole in the lower portion of the insulator 17 and the upper end of the inner conductor 16 are threaded, and the conductor 16 is turned into the conductor 17. A lower insulator 18 has an upper shoulder to fit in the lower end of the outer conductor 15, and has a diametral bore for receiving a pin 23. The lower end of the inner conductor 16 has a mating diametral bore such that the pin 23 secures the insulator 18 to the conductor 16. After the piano wire 20 and the insulators 17 and 18 are assembled to the inner conductor 16, the assembly is placed in the lower end of the outer conductor 15 at a position where the upper surface of the insulator 17 is slightly below the vent 22. Fluid epoxy cement 24 is now injected through the vent 22 over the upper surface of the insulator 17. The assembly is pressed upwardly immediately to seat the insulator 18, and the epoxy cement 24 spreads over the upper surface of the insulator 17 and along in the space between the insulator and the inside wall of the outer conductor 15. Before the cement 24 sets, the vent 22 is cleared.

For clarity, the probes 11 and 12 shown mounted in a tank 30 of FIG. 4 are shown separated slightly. Preferably, the lower end of the capacitive portion of the probe 11 is a short distance above the bottom of the tank 30 so that it does not extend into water that may have collected in the tank. The insulating washer 18 may serve as a support and have the required thickness to space the capacitive portion above the bottom of the tank. Parts of the tank 30 and of the probes 11 and 12 are cut away so that only the lower and upper portions of the probes are shown in detail. The length of the inner conductor 16 of the probe 11 might be about one-fourth the height of the tank 30, and the length of the probe 12 that has an inner conductor 26 throughout its length may be only slightly shorter than the height of the tank. The lower end of the probe 12 is a sufficient distance above the level of the lower end of the capacitive portion of the probe 11 to provide a difference in capacitance for developing a reference voltage as described below for levels of liquid below the upper end of the inner conductor 16 of the probe 11.

The inner conductor 26 of the probe 12 is mounted coaxially within the outer conductor 12 between a lower insulating washer 27 and an upper insulating washer 28. The lower end of the inner conductor 26 is secured to the washer 27 by a pin or other suitable manner, and the upper end of the inner conductor 26 may be threaded to receive a retaining nut 29 above the washer 28. The upper ends of the outer conductors 11 and 12 are secured to the bottom of the housing 13 in which electronic circuits are mounted. The housing 13 is preferably a sliding fit within an aperture of the tank 30 while the probe assembly 10 is supported on the bottom of the tank 30 by the insulating washer 18. If accuracy does not require the bottom to be used as a reference level, the probe assembly 10 may be suspended from the top of the tank.

Part of the electronic circuits 31 and 32, called hereinafter capacitive measuring circuits, are connected to the probes 11 and 12 to develop voltages as a function of the capacitances of the respective probes. The mounting of the housing 13 of the electronic circuits at the tops of the probes 11 and 12 for maintaining short connecting leads and the low-capacitance of the coaxial conductor 20 contribute to low input capacitances for obtaining good sensitivity for measurement of changes in capacitances of the probes 11 and 12. Well-known capacitive measuring circuits may be used, but the new capacitive measuring circuits 31 and 32 shown schematically at the top of FIG. 4 are preferred. The circuits 31 and 32 are adjustable to cancel the capacitances, that is, to provide zero outputs while the probes 11 and 12 are empty. High-gain amplifiers 33 and 37 connected in feedback arrangements provide outputs that reflect accurately the capacitance changes of the respective probes 11 and 12.

Since the capacitive measuring circuits 31 and 32 are similar except that the values of their capacitors are selected according to the capacitances of their respective probes, only capacitive measuring circuit 31 will be described in detail. It contains high-gain amplifier 33 connected to a capacitive divider or half-bridge circuit comprising capacitors 34, 35, and the capacitive portion of the probe 12. A source of a-c voltage 36, for example, a 7-kilohertz oscillator, provides operating voltages to the capacitive measuring circuits 31 and 32. The amplitudes of the output voltages of the amplifiers 33 and 37 of the respective capacitive measuring circuits are functions of the increases in capacitance of the respective probes 12 and 11 resulting from the presence of liquids. The capacitor 34 has one terminal connected to the output of the source of a-c voltage 36, and the capacitor 35 has one terminal connected to the output of the amplifier 33. The other terminals of each of these capacitors are connected together and connected to the inner conductor 26 of the main or measuring probe 12 and also to a terminal 38 of the input of the amplifier 33. The capacitor 35 completes a negative feedback circuit between the output and the input of the amplifier 35. The amplifier 33 has another terminal 39 of its input circuit connected to the arm 40 of a potentiometer 41 for applying a predetermined amount of voltage from the source 36. The arm 40 is adjusted to provide zero voltage at the output 42, thereby to cancel the capacitance of the probe 12 while it is empty according to the mathematical analysis below.

Let $V_i$ be the voltage at the output of the source 36, and $A$ be the multiplier of the voltage $V_i$ to provide voltage $AV_i$ at the arm 40 of the potentiometer 41. Also, let $V_o$ be the output of the amplifier 33, the capacitance of the probe 12 be $C_{12}$, and the capacitances of the capacitors 34 and 35 be $C_{34}$ and $C_{35}$ respectively. Since the voltage between the terminals 38 and 39 of the input of the high-gain amplifier 33 is very small, it will be treated as though it were zero, and an equation for the operation of the capacitive measuring circuit 31 will be $$\frac{V_i - AV_i}{\frac{1}{jwC_{34}}} + \frac{V_o - AV_i}{\frac{1}{jwC_{35}}} = \frac{AV_i}{\frac{1}{jwC_{12}}}.$$

Therefore $$V_o = V_i \frac{A(C_{34} + C_{12} + C_{35}) - C_{34}}{C_{35}}, \text{ and}$$

$V_o$ will become zero when the potentiometer 41 is adjusted so that $$A(C_{34} + C_{12} + C_{35}) = C_{34}.$$

Any voltage $V_o$ at the outputs 42 and 43 is a result of increase capacitances in the respective probes 12 and 11 caused by presence of fluid.

Systems for measuring capacitance to determine level usually have means for compensating for different permittivities of different liquids and for changing permittivity resulting from temperature changes in a particular liquid. Assuming that the density and the permittivity of a liquid are unchanging, a detector and a display device calibrated for this hypothetical situation could be connected to the output 42 of the capacitive measuring circuit 31 for obtaining desired readings. To obtain readings on a single calibrated scale for actual conditions, compensation is obtained by using the voltage at output 43 of the capacitive measuring circuit 32 connected to the capacitive portion of the reference probe 11. In the circuits shown in FIGS. 5, 6, and 7, the difference between the voltages appearing on outputs 42 and 43 of the respective capacitive measuring circuits 31 and 32 is used to control the amplitude of the source of a-c voltage or oscillator 36 while the level of the liquid surrounding the probes is low, and for higher levels the voltage derived from only the output 43 is used to control the amplitude of the oscillator 36. In these arrangements, at low levels of liquid, the amplitude of the oscillator 36 is controlled to provide a predetermined difference in output voltage resulting from the difference in capacitance between the two probes 11 and 12, and at higher levels to provide a constant reference output regardless of variation in capacitance of the submerged probe 11 caused by changing permittivity. While the amplitude of the output of the oscillator 36 is controlled in this manner with respect to the reference probe 11, the oscillator is controlled to provide a compensated reading at the output 42 of the capacitive measuring circuit 31 independent of changes in permittivity. In the system shown in FIG. 8, a ratio of the outputs of the two capacitive measuring circuits is used to provide an indication of level independent of permittivity.

More particularly, the main measuring circuit of the system according to FIG. 5 includes the oscillator 36 and the capacitive measuring circuit 31 connected to the probe 12 as described above. The output 42 of the capacitive measuring circuit 31 is connected to the input of a peak detector 44, and the d-c output of the peak detector is connected to a level indicator 45. The level indicator 45 may typically include d-c amplifiers and remote, calibrated d-c meters. Other than the capacitive measuring circuit 32 connected to the reference probe 11, the remainder of the circuit and the equivalent portions in the circuits described below are herein referred to as compensating circuits.

As briefly described above, the compensating circuits of the present systems have two modes of operation. An on-off switch 46 may be a transistor switch and has a control input connected to the main measuring circuit to determine the mode of operation. The switching terminals of the switch 46 are connected between the output 42 of the capacitive measuring circuit 31 and the input 51 of a difference amplifier 50. The control circuit of the switch 46 includes a comparator 47 having one input connected to the output of the peak detector 44 and another input connected to a d-c voltage divider 48. Each of the comparators used for control purposes in the various embodiments of the electronic circuits may be a conventional high-gain circuit that provides substantial output voltage for small voltage difference between two input terminals, the polarity of the output voltage being determined by the polarity of the voltage across the input terminals. Resistive values in the voltage divider 48 are selected such that the comparator 47 becomes effective to operate switch 46 to an "off" state in response to the voltage that is controlled by probe 12 and derived from the measuring channel exceeding a predetermined value. A variable resistor 86 in the voltage divider 48 is adjusted for the switch 46 to operate as the level of liquid passes through a level even with the upper end of the inner conductor 16 of the reference probe 11. As the liquid rises above this level the switch 46 is operated to an "off" state, and as the liquid falls below this level, a switch is again operated to its "on" state.

For either mode of operation, voltage is applied from the output 43 of the capacitive measuring circuit 32, that is connected to the reference probe 11, to an input 49 of the difference amplifier 50. The on-off circuit of the switch 46 is connected to the other input 51 of the amplifier 50. The output of the amplifier 50 is connected to the input of the peak detector 52. The a-c voltage applied to the input of the peak detector 52 is therefore a function of the output of both the capacitive measuring circuits 31 and 32 while level of liquid is intermediate the limits of the overlapping, capacitive portions of the probes 11 and 12, and the voltage is a function of the output of the capacitive measuring circuit 32 alone when the capacitive portion of the probe 11 is full of liquid. The gain between the output 43 of the capacitive measuring circuit 32 and the output of the amplifier 50 is controlled by the values of the resistor 53 and the variable resistor 54 connected as a voltage divider between the output 43 of the capacitive measuring circuit 32 and the input 49 of the amplifier 50. While the switch 46 is on, the gain required in the channel connected to the input 51 of the amplifier 50 is determined by a negative feedback resistor 55 connected between the output of the amplifier 50 and its input 51 and by the variable resistor 93 connected between the switch 46 and the input 51.

The output of the peak detector 52 is connected to an input 57 of a d-c voltage comparator 56, and the other input 58 of the comparator 56 is connected to a d-c voltage divider 59. The output of the comparator 56 is connected to the control input 60 of the oscillator 36. Since the gain of the comparator 56 is quite high, a small departure of the voltage applied to the input 57 from the voltage applied from the voltage divider 59 to the input 58 provides a substantial change in the controlling voltage applied to the input 60 of the oscillator 36. If the mode-controlled switch 46 is on and if the difference in voltages at the outputs 42 and 43 of the capacitive measuring circuits 31 and 32 respectively is too high, voltage applied to input 57 of the comparator 56 is greater than the voltage applied to its input 58 from the voltage divider 59, and the control voltage developed in the output of the comparator 56 is the proper polarity as applied to the control circuit 60 of the oscillator 36 to decrease the amplitude of the output of the oscillator until the voltages applied to the inputs 57 and 58 of the comparator 56 are substantially equal. In a similar manner should the voltages at the outputs of the capacitive measuring circuits 31 and 32 decrease in value below the value determined by the voltage divider 59, the output of the comparator 56 will change as required to increase the amplitude at the output of the oscillator 36. While the mode-controlled switch 46 is off, the capacitive portion of the probe 11 is submerged in liquid; the capacitance of the capacitive portion of the probe 11 is determined by the permittivity of the liquid in which it is submerged; and this capacitance determines the control voltage applied to the oscillator 36.

The circuit of FIG. 6 is similar to that of FIG. 5 in that a controlled oscillator 36 applies signal to capacitive measuring circuits 31 and 32, and the peak detector 44 is connected to the capacitive measuring circuit 31 to provide signal for level indication to level indicator 45. Diodes 61 and 62 of FIG. 6 perform the function of the control switch 46 of FIG. 5. The voltage applied to the anode of the diode 61 is derived from both capacitive measuring circuits 31 and 32 to control the amplitude of the oscillator 60 while the level of liquid is intermediate the limits of the overlapping portions of the probes 11 and 12, and the voltage applied to the anode of the diode 62 is derived from only the capacitive measuring circuit 32 while the level of liquid is above the capacitive portion of the probe 11.

The output of the capacitive measuring circuit 31 is connected through a gain control or voltage divider through one input of a difference amplifier 63, and the output of the capacitive measuring circuit 32 is connected through another gain control to the other input of the difference amplifier 63. The a-c signal present at the output of amplifier 63 is applied to the input of a peak detector 64, and the output of the peak detector is connected to an input of a comparator 65. Like the circuits of the comparator 56 of FIG. 5, the other input of the comparator 65 is connected to a voltage divider 66 for determining range of output. The output of the capacitive measuring circuit 32 is connected to the input of a peak detector 67, and the output of the peak detector 67 is connected to an input of a comparator 68. The other input of this comparator is also connected to a d-c voltage divider 69 for determining the amount of voltage to be applied from the output of the peak detector 67 for obtaining a desired voltage at the output of the comparator 68. The d-c voltage appearing at the output of the comparator 68 for application to the anode of the diode 62 is dependent on the capacitance of the probe 11. The cathodes of the diodes 61 and 62 are connected to the input 60 of the oscillator 36. The gain controls and the voltage dividers are adjusted such that the voltage applied to the anode of the diode 61 is greater than the voltage applied to the anode of the diode 62 while the level of liquid is intermediate the limits of the overlapping levels of the capacitive portions of the probes 11 and 12, and the voltage applied to the anode of the diode 62 is greater while the level of liquid is above the capacitive portion of the probe 11.

Figure 7:
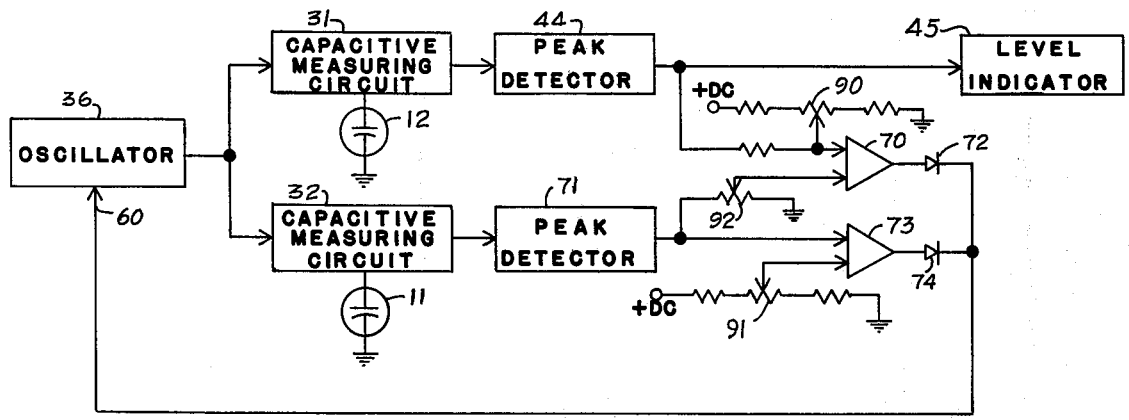

The circuit of FIG. 7 has capacitive measuring circuits and the main channel like those shown in FIGS. 5 and 6, but the difference amplifier 70 in the compensating circuit has d-c inputs and output rather than a-c inputs and output. The d-c amplifier 70 has applied to its respective inputs voltages derived from the output of the peak detector 44 that has its input connected to the capacitive measuring circuit 31 and from the output of a peak detector 71 that has its input connected to the output of the capacitive measuring circuit 32. The inputs of the comparator 70 have potentiometers 90 and 92 respectively for providing desired gain and d-c voltage level for determining bias on diodes 72 and 74. The output of the amplifier 70 is connected to the anode of the diode 72 that corresponds to the diode 61 of FIG. 6. A peak detector 71 has its input connected to the capacitive measuring circuit 32 and its output connected to one of the inputs of a comparator 73 in addition to the connection to the input of the difference amplifier 70. The other input of the comparator 73 is connected to a voltage divider circuit including a potentiometer 91, and the output of the amplifier is connected to the anode of the diode 74 that corresponds to the diode 62 of FIG. 6. As described above for the circuit of FIG. 6, the cathodes of the diode 72 and 74 are connected to the input control circuit of the oscillator 36.

Figure 8:
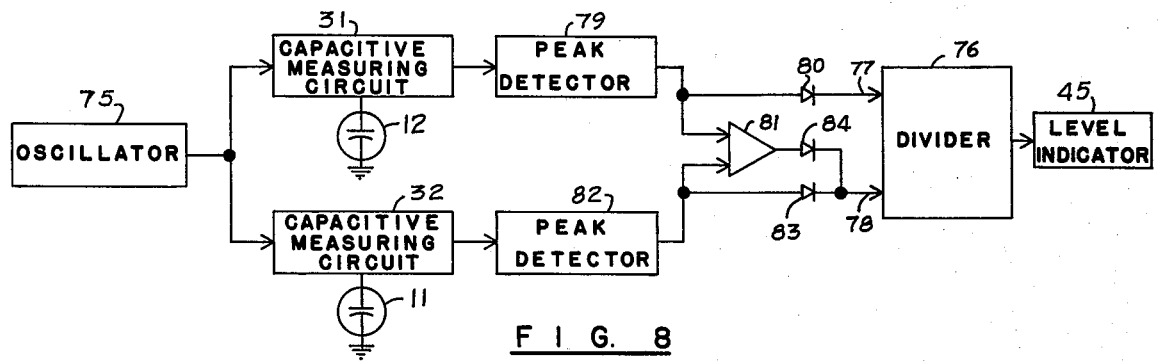

The circuit of FIG. 8 differs from the circuits shown in FIGS. 5, 6, and 7 in that the oscillator 75 does not have control circuits for controlling the amplitude of its output, and compensation is provided by a transistor voltage divider circuit rather than an oscillator control circuit. A divider 76 is the type now available commercially for providing at its output a quotient of the values applied to its two inputs. The detected output of the main capacitive measuring circuit 31 is applied to an input 77 of the divider 76 to be divided by a value dependent on permittivity applied to the input 78 of the divider 76 for obtaining a quotient independent of permittivity at the output of the divider.

The output of the capacitive measuring circuit 31 is connected to the input of a peak detector 79, and the output of the peak detector 79 is applied through a diode 80 to the input 77 of the divider 76. The output of the peak detector 79 is also applied to one input of the d-c difference amplifier 81. The output of the capacitive measuring circuit 32 is connected to the input of the peak detector 82, and the output of the detector is connected to the other input of the difference amplifier 81 and through a diode 83 to the input 78 of the divider 76. The output of the difference amplifier 81 is connected through a diode 84 also to the input 78 of the divider 76. The gain for each of the inputs of the amplifier 81 is adjusted as required. The diodes 80, 83, and 84 connected with polarities as shown provide measuring signal to the input 77 of the divider 76 and provide a reference signal to the input 78 derived either from the capacitive measuring circuit 32 alone or from the capacitive circuits 31 and 32 together according to whether the level of liquid is higher or lower than the level even with the upper end of the capacitive portion of the probe 11. Since voltages derived from the capacitive measuring circuits 31 and 32 are each proportional to the amplitude of the oscillator and each proportional to the permittivity of liquid being measured, the ratio of these voltages derived at the output of the divider 76 is substantially independent of usual variations in voltage at the output of the oscillator and in the permittivity of the liquid being measured.

Variable resistors or potentiometers in the different circuit embodiments of the system are adjusted to provide output in accordance with the calibration of the level indicator. Regardless of the different compensating circuits shown in FIGS. 5–8, each of the capacitive measuring circuits 31 and 32 are first adjusted to provide zero output while the probes 11 and 12 are empty. With reference to FIG. 4, the potentiometer 41 is adjusted to provide zero voltage at the output 42 of the capacitive measuring circuit 31, and potentiometer 85 is adjusted to provide zero voltage at output 43.

With reference to FIG. 5, while the probes 11 and 12 are in a calibrated test tank, the level of liquid is slightly below the upper end of the capacitive portion of the probe 11, and the mode switch 46 is closed, the variable resistor 54 in the divider circuit between the output of the reference capacitive measuring circuit 32 and an input of the difference amplifier 50, is adjusted until the variable resistor 93 in the other input of the amplifier can be varied and have no effect on the output of the system. The voltage to be observed during this adjustment may be from any one of several different points; measurement of voltage at the output of the oscillator 36 is satisfactory. For example, a setting is found for the resistor 54 such that the change of resistor 93 is not effective in changing the output of the oscillator 36.

The sensitivity (millivolts per inch) is measured while the level of liquid is near the upper end of the measuring probe 12. After noting this sensitivity, the tank is partly drained until the level of liquid is only a few inches from the bottom. While the mode switch 46 is on, the variable resistor 93 is adjusted to provide the same sensitivity as that noted while the tank is nearly full.

The voltage divider 59 that determines the reference voltage for controlling the amplitude of the output of the oscillator 36 is now adjusted to obtain a desired maximum scale reading for a full tank. While the level of liquid about the probes 11 and 12 corresponds to a full tank and the mode switch 46 is open, the voltage divider 59 is adjusted to obtain the desired maximum voltage to provide a full-scale reading on the level indicator 45.

Figure 9:
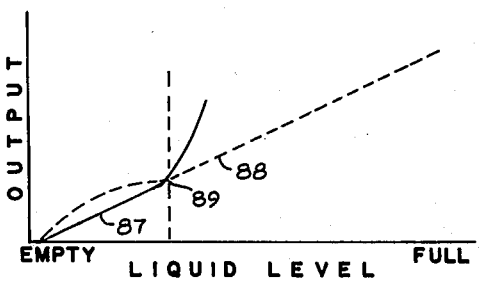
FIG. 9 is a characteristic curve of the circuit of this invention to show the crossover point between its two modes of operation.

Finally, variable resistor 86 of the voltage divider 48 that determines the threshold voltage for operation of the mode switch 46 is adjusted to obtain a continuous linear curve as represented in FIG. 9 by the lower portion of the solid curve 87 and the upper portion of the broken curve 88. The curve 87 is the output of the system while the switch 46 is closed, and the curve 88 is the output of the system while the switch 46 is open. The portion of the curve 87 below the desired crossover point 89 is linear but rises rapidly above the crossover point 89. Conversely, the curve 88 for higher levels of liquid while the switch 46 is open, is linear above the desired crossover point 89, but the curve tends to drop rapidly for low readings. While the level of liquid in the test tank is even with the upper end of the capacitive portion of the probe 11, the variable resistor 86 is adjusted to obtain the threshold point of operation of the switch. The operation of the switch can be checked by varying the level of the liquids slightly above and below the upper end of the capacitive portion of the probe 11.

Since the circuit shown in FIG. 7 uses a pair of diodes for switching and has a d-c differential amplifier, its adjustment differs from that for FIG. 5. The two capacitive measuring circuits are adjusted as described above. The desired sensitivity (output voltage change per inch of change in level of fluid) at the level indicator is determined. The resistor 90 is adjusted until the voltage measured between the tap or arm of the resistor 90 and the common return or ground is equal to the determined sensitivity times the distance that the capacitive portion of the reference probe 11 extends below the level even with the bottom of the capacitive portion of the measuring probe 12.

I claim:

1. A capacitive probe assembly having first and second elongated capacitive portions adapted to be inserted vertically in a container, said first and second capacitive portions having first and second capacitive electrodes respectively, the length of each of said capacitive electrodes being predetermined to define the effective length of said respective capacitive portion, each of the capacitive portions being the type that change capacitance and provide a respective output as a function of the change in proportional amount of said respective capacitive electrode that is surrounded by liquid in which it is inserted, said second capacitive electrode extending downwardly from a first level to a lower second level, said first and second levels defining a range through which levels are to be measured, said first capacitive electrode extending downwardly from a level intermediate said first and second levels in an overlapping relation to the lower portion of said second capacitive electrode and continuing far enough below said second level at which said second capacitive electrode is terminated to provide significant detectable change in capacitance of said first capacitive portion due to filling the space below said second level with liquid, capacitive measuring means connected to said second capacitive portion to provide a reading of level of liquid at any level within said range of levels, and compensating circuit means connected to both said first and second capacitive portions and to said capacitive measuring means, said compensating circuit means operative in response to receiving said outputs from both said first and second capacitive portions to compensate said reading for changes in permittivity of liquid into which said capacitive portions are inserted.

2. A capacitive probe assembly as claimed in claim 1 wherein said first and second capacitive portions have first and second rigid tubular outer conductors and first and second insulated cylindrical inner conductors respectively, said first and second inner conductors being said first and second capacitive electrodes respectively and being mounted coaxially within said first and second outer conductors respectively, the extent of said inner conductors within their respective outer conductors being the extent of said respective first and second capacitive electrodes.

3. A capacitive probe assembly as claimed in claim 2 wherein said first outer conductor extends higher than said first inner conductor at least to said first level, a seal in said first outer conductor about said first inner conductor at said intermediate level to prevent liquid from flowing upwardly into that portion of the first outer conductor above said seal, a conductive wire for connection to said first capacitive portion connected to said first inner conductor at said intermediate level and extending coaxially upwardly within said first outer conductor, said conductive wire being insulated from said outer conductor and having small diameter and low distributed capacitance compared with those of said first inner conductor.

4. A system for measuring level of liquid comprising:

first and second channels providing voltages corresponding to levels of liquid, first and second capacitive measuring circuits connected in said first and second channels respectively, a measuring probe assembly having first and second elongated capacitive portions connected to said first and second capacitive measuring circuits respectively, each of said capacitive measuring circuits being adjusted to provide output voltage proportional to the increased amount of capacitance of the respective one of said capacitive portions due to presence of liquid, said capacitive portions having similar uniform capacitive characteristics over equal lengths thereof and being adapted to be positioned vertically in a container in which level of liquid is to be measured, said second capacitive portion being of such length to extend downwardly from a first level in a container to a lower second level, said first and second levels defining a range through which levels are to be measured, said first capacitive portion being of such length and positioned with respect to said second capacitive portion to extend downwardly from a level intermediate said first and second levels in an overlapping relation to the lower portion of said second capacitive portion and continuing far enough below said second level at which said second capacitive portion is terminated to provide significant detectable change in capacitance of said first capacitive portion due to filling the space below said second level with liquid, an output metering circuit connected to said second channel to respond to said output voltage of said second capacitive measuring circuit for providing reading for the level of liquid within said range, a compensating circuit operable to compensate said reading for differences in permittivity of liquid, said compensating circuit including switching means for conditioning said compensating circuit for first and second modes of operation, first and second inputs connected to said first and second channels respectively to receive output voltage from said respective capacitive measuring circuits, and an output of said compensating circuit connected to said second channel for controlling the amplitude of its output for compensating said reading, said switching means having control means connected to at least one of said channels to receive voltage derived from said respective capacitive measuring circuit, said switching means operable between a first state and a second state in response to the voltage applied to said control means from said channel to which it is connected passing through a value for said intermediate level of liquid substantially even with the upper end of said first capacitive portion, said switching means being in said first state while the level of liquid is between said intermediate and second levels where said capacitive portions are overlapped to cause said compensating circuit to be in its first mode of operation to respond to the difference in voltages derived from said first and second channels, and said switching means being in said second state while level of liquid is higher than said intermediate level to exclude from said compensating circuit voltage from said second channel and to cause said compensating circuit to be in its second mode of operation to respond to voltage from only said first channel.

5. A measuring system as claimed in claim 4 having a controlled source of a-c signal, said controlled source of a-c signal having an output and a control input, said output of said source of a-c signal connected to each of said capacitive measuring circuits, and said output of said compensating circuit that is connected to said second channel for controlling its amplitude being connected to said control input of said source of a-c signal.

6. A measuring system as claimed in claim 4 wherein each of said capacitive measuring circuits comprises an amplifier with first and second input terminals, first and second capacitors, and a voltage divider, a source of a-c signal having first and second output terminals connected to said voltage divider to apply signal thereacross, an intermediate tap of said voltage divider being connected to said first input terminal of said amplifier, said first capacitor being connected between said first output terminal of said source of a-c signal and said second input terminal of said amplifier, said second capacitor connected between the output of said amplifier and said second input terminal, the respective one of said capacitive portions to be measured connected between said second input terminal of said amplifier and said second output terminal of said source of a-c signal, and the output of said amplifier in each of said capacitive measuring circuits connected to said respective compensating circuit, each of said voltage dividers providing at its tap the required voltage to provide in the output of said respective amplifier a predetermined voltage corresponding to the capacitance of said respective capacitive portion while it is empty.

7. A measuring system as claimed in claim 4 wherein said measuring probe assembly comprises first and second parallel rigid tubular outer conductors adapted to extend vertically in a container, said first tubular outer conductor extending at least from said first level downwardly below said second level at least to the level at which said first capacitive portion is terminated, said second tubular outer conductor extending at least between said first and second levels, said first and second capacitive portions comprising first and second inner conductors mounted coaxially in said first and second outer conductors respectively, the vertical extents of said first and second inner conductors being the respective vertical extents of said first and second capacitive portions, a seal in said first outer conductor about the upper end of said first inner conductor at said intermediate level to prevent liquid from flowing into that portion of said first outer conductor above said first inner conductor, a conductive wire mounted coaxially within that portion of said first outer conductor extending upwardly above said intermediate level, said wire insulated from said first outer conductor and connected between said first inner conductor and said first capacitive measuring circuit, the diameter of said wire and its distributed capacitance being relatively small compared with those of said first inner conductor.

8. A measuring system as claimed in claim 4 wherein said compensating circuit comprises a divider having two inputs and an output, said switching means and its control means comprising a differential amplifier and a pair of diodes, said first capacitive measuring circuit connected through one of said diodes to one of said inputs of said divider, both said first and second capacitive measuring circuits connected to respective inputs of said differential amplifier, the output of the differential amplifier connected through the other one of said diodes also to said one input of said divider, said second capacitive measuring circuit connected to the other of said inputs of said divider, and said output metering circuit being connected to said second channel by being connected to said output of said divider.

9. A system for measuring level of liquid comprising:
a probe assembly having first and second elongated capacitive portions, said capacitive portions having similar capacitances per unit of length, said probe assembly being adapted to position said capacitive portions vertically to predetermined different depths in a container for liquids, said second capacitive portion extending downwardly from a first level to a lower second level, said first and second levels defining a range through which levels are to be measured, said first capacitive portion extending downwardly from said first level and continuing far enough downwardly below said second level where said second capacitive portion is terminated to provide significant detectable change in capacitance of said first capacitive portion due to filling the space below said second level with liquid, each of said capacitive portions admitting liquid as a dielectric to a height of liquid in which they are inserted, a source of controlled alternating current having an output and a control input, the amplitude of the alternating-current voltage at said output being controlled by application of voltage to said control input, first and second capacitive measuring circuits including said first and second capacitive portions respectively, each of said capacitive measuring circuits connected to said source of alternating current for applying operating voltage thereto and each having an output for providing an a-c voltage that has an amplitude as a function of the capacitance of the respective one of said capacitive portions and of the operating voltage applied to said respective capacitive measuring circuit from said controlled source of alternating current, a difference circuit having first and second inputs connected to said outputs of said first and second capacitive measuring circuits respectively, detecting means, said difference circuit connected to said detecting means for applying thereto a-c voltage proportional to the difference in capacitances of said capacitive portions, said detecting means having an output connected to said control input of said source of controlled alternating current, said output of said source of controlled alternating current being controlled by said output of said detecting means to maintain the difference in the outputs of said capacitive measuring circuits substantially constant while level of liquid is between said first level and said second level to compensate for changes in permittivity of the liquid into which said capacitive portions are inserted, and an output metering circuit connected to said output of one of said capacitive measuring circuits to display the level of the liquid into which said capacitive portions are inserted.

10. A system for measuring level of liquid as claimed in claim 9 wherein said second capacitive portion extends upwardly through said first level in the container in which said probe assembly is inserted at least to the highest level at which the liquid is to be measured, said second level and said highest level defining an extended range through which levels are to be measured, said output metering circuit being connected to said second capacitive measuring circuit, said first capacitive portion being short enough to be entirely submerged while the level of liquid is above said first level at a relatively low level in said container, switching means connected between the output of said second capacitive measuring circuit and said second input of said difference circuit, a mode control circuit connected between said second capacitive measuring circuit and said switching means, said switching means being operable between a closed state and an open state in response to voltage applied thereto from said mode control circuit passing through voltage for said first level at which said first capacitive portion becomes entirely submerged, the voltage applied from said mode control circuit being a function of the a-c voltage supplied from the output of said second capacitive measuring circuit, said switching means being in said closed state in response to the level of the liquid in the container being below said first level such that the amplitude of the output of said controlled alternating current is a funcof the difference in capacitances of said first and second capacitive portions, said switching means being in said open state in response to the level of the liquid being above said first level to disconnect said difference circuit from said second capacitive measuring circuit, said difference circuit while disconnected from said second capacitive measuring circuit responding to changes only from said first capacitive measuring circuit for controlling the output of said controlled alternating current to the extent required to maintain substantially constant the output of said first capacitive measuring circuit while said first capacitive portion is submerged and thereby to compensate the readings in said output metering circuit.

11. A system for measuring level of liquid comprising:

a probe assembly having first and second elongated capacitive portions, said capacitive portions having similar capacitances per unit of length, said probe assembly being adapted to position said capacitive portions vertically to predetermined different depths in a container for liquids, said second capacitive portion extending downwardly from a first level to a lower second level, said first and second levels defining a range through which levels are to be measured, said first capacitive portion extending downwardly from said first level and continuing downwardly through said second level where said second capacitive portion is terminated to provide significant detectable change in capacitance of said first capacitive portion due to filling the space below said second level with liquid, each of said capacitive portions admitting liquid as a dielectric to a height of liquid in which they are inserted, a source of controlled alternating current having an output and a control input, the amplitude of the alternating-current voltage at said output being controlled by application of voltage to said control input, first and second capacitive measuring circuits including said first and second capacitive portions respectively, each of said capacitive measuring circuits connected to said source of alternating current for applying operating voltage thereto and each having an output for providing an a-c voltage that has an amplitude as a function of the capacitance of the respective one of said capacitive portions and of the operating voltage applied to said respective capacitive measuring circuit from said controlled source of alternating current, first and second detecting means connected to said outputs of said first and second capacitive measuring circuits respectively, a difference circuit having first and second inputs connected to said first and second detecting means respectively, said first and second detecting means applying d-c voltage proportional to the difference in capacitances of said capacitive portions to said first and second inputs of said difference circuit, said difference circuit having an output connected to said control input of said source of controlled alternating current, said output of said source of said controlled alternating current being controlled by said output of said difference circuit to maintain the difference in the outputs of said capacitive measuring circuits substantially constant while level of liquid is between said first level and said second level to compensate for changes in density of the liquid into which said capacitive portions are inserted, and an output metering circuit connected to said output of one of said capacitive measuring circuits to display the level of the liquid into which said capacitive portions are inserted.

12. A system for measuring level of liquid as claimed in claim 11 wherein said second capacitive portion extends upwardly through said first level in the container in which said probe assembly is inserted at least to the highest level at which the liquid is to be measured, said second level and said highest level defining an extended range through which levels are to be measured, said output metering circuit being connected to said second capacitive measuring circuit, said first capacitive portion being short enough to be entirely submerged while the level of liquid is above said first level at a relatively low level in said container, a pair of diodes having similar electrodes connected to said control input of said source of controlled alternating current, the other electrode of one of said diodes being connected to the output of said difference circuit, and means for connecting the output of said first detecting means to the other electrode of the other of said diodes, said one diode being conductive and said other diode being non-conductive in response to the application of voltages thereto while level of liquid is between said first level and said second level, and said other diode being conductive and said one diode being non-conductive while level of liquid is higher than said first level.

\* \* \* \* \*